(12) United States Patent
Badt, Jr.

(10) Patent No.: US 7,324,750 B2
(45) Date of Patent: Jan. 29, 2008

(54) PROTECTION SCHEME FOR A COMMUNICATION NETWORK

(75) Inventor: Sig Harold Badt, Jr., Richardson, TX (US)

(73) Assignee: Alcatel Lucent, Paris (FR)

( * ) Notice: Subject to any disclaimer, the term of this patent is extended or adjusted under 35 U.S.C. 154(b) by 1029 days.

(21) Appl. No.: 10/320,244

(22) Filed: Dec. 16, 2002

(65) Prior Publication Data
US 2004/0114513 A1    Jun. 17, 2004

(51) Int. Cl.
*H04B 10/08* (2006.01)
(52) U.S. Cl. .............................. 398/1; 398/9
(58) Field of Classification Search ............ 398/2, 398/5, 1, 9; 370/225, 254; 340/2.23; 703/21–22; 709/239; 714/4
See application file for complete search history.

(56) References Cited

U.S. PATENT DOCUMENTS 6,137,775 A    10/2000 Bartlett et al.
6,963,995 B2 *  11/2005 Fee ............................... 714/4
2002/0191247 A1 * 12/2002 Lu et al. ...................... 359/124
2003/0065811 A1 *  4/2003 Lin et al. ..................... 709/232

FOREIGN PATENT DOCUMENTS

WO    97/01143 A1    1/1997

* cited by examiner

*Primary Examiner*—Leslie Pascal
(74) *Attorney, Agent, or Firm*—Bobby D. Slaton; Jessica W. Smith

(57) ABSTRACT

Method and apparatus for implementing a protection scheme for switched networks, and particularly GMPLS networks are described. One embodiment is a method of reserving communications channels comprising an alternative path through a switched network, the network comprising a plurality of nodes interconnected by links, wherein each link comprises at least one communications channel. The method comprises simulating failure of a first link; noting a second link over which traffic on the first link is rerouted in the event of failure of the first link; and transmitting a protection request message ("PRM") from the first link to the second link to request reservation of a specified number of communication channels on the second link.

25 Claims, 3 Drawing Sheets

PROTECTION SCHEME FOR A COMMUNICATION NETWORK

BACKGROUND OF THE INVENTION

1. Technical Field of the Invention

The present invention generally relates to communication networks. More particularly, and not by way of any limitation, the present invention is directed to a protection scheme for such networks.

2. Description of Related Art

A network operator typically takes into consideration multiple objectives when routing traffic through a network. One objective may be to minimize cost. Another objective may be to minimize transmission impairments. A third objective may be to maximize the possibility that the network can be restored in the event of a failure thereof.

Generally, there are three types of restoration schemes: dedicated restoration, shared restoration, and best effort restoration. In dedicated restoration, the capacity of a protection, or restoration, path is reserved for an individual demand. In shared restoration, the restoration capacity is reserved, but shared across multiple demands. In best effort restoration, no reservation is made and restoration capacity is allocated in real time on an as-available basis. The first two classes of restoration both have guaranteed restoration in the event of a single failure; however, they differ in restoration time, as shared restoration requires real-time path setup.

A system has been developed that can work as part of an optical cross-connect to perform distributed mesh restoration. This system uses GMPLS protocols including OSPF, LMP, and RSVP, to restore traffic in the event of a network failure. An intelligent mesh restoration scheme is based on diversely routed service and restoration paths.

An intelligent mesh routing algorithm computes disjoint paths for an end-to-end connection demand. The path computation is based on availability of capacity in such a way that overall network resource utilization is optimized. The network resource optimization not only enables the network to increase the amount of traffic carried, it enables the more even distribution of traffic across the network so that there are no bottlenecks. Since the path computation is distributed, the route utilization optimization is performed by dynamically tuning link weights.

In mesh restoration, protection paths may be predefined; however, the cross-connections along the paths are not created until a failure occurs. During normal operation, the optical channels reserved for protection are not used. When the capacity is only "soft reserved", the same optical line can be shared to protect multiple lightpaths. Upon an actual link failure, the ingress and egress nodes of each path interrupted by the failure transmit a request to the nodes along the respective protection path to establish the cross-connections for the disconnected path. Once the cross-connections are established, the ingress and egress nodes restore the connection to the new path.

The concepts of link failure and path restoration are illustrated generally with reference to FIGS. 1A-1D. Referring first to FIG. 1A, illustrated therein is a generalized multi-protocol label switched ("GMPLS") optical transport network 100 comprising a plurality of nodes 102A-102F interconnected by links 104A-104J. A working path through the network 100 is represented by a heavy black line designated by a reference numeral 106 and traverses the network via the nodes 102B, 102A, 102C, and 102E, and the links 104A, 104G, and 104F. Assume now that the link 104A fails for some reason and the traffic on the path 106 must be rerouted. According to mesh restoration techniques, there are several alternative paths, which are illustrated in FIGS. 1B-1D.

In particular, FIG. 1B illustrates a first alternative path, which is represented by a heavy black line designated by a reference numeral 110 and which traverses the network 100 via the nodes 102B, 102D, 102C, and 102E, and the links 104C, 104D, and 104F.

FIG. 1C illustrates a second alternative path, which is represented by a heavy black line designated by a reference numeral 120 and which traverses the network 100 via the nodes 102B, 102C, and 102E, and the links 104B and 104F.

FIG. 1D illustrates a third alternative path, which is represented by a heavy black line designated by a reference numeral 130 and which traverses the network 100 via the nodes 102B, 102C, 102F, and 102E, and the links 104B, 104J, and 104I.

In each of the restoration path examples illustrated in FIGS. 1B-1D, it will be recognized that sufficient capacity must have been previously reserved on the links used to construct the alternative, or protective, paths in order for restoration to be accomplished successfully.

Because, as previously noted, the optical channels reserved for protection are not used to carry traffic, it is advisable to reserve as few channels as possible, while making sure that enough channels are reserved to provide real protection in the event of a link failure. The objective, therefore, is to determine the optimum number of protective channels to reserve for each link.

SUMMARY OF THE INVENTION

Accordingly, the present invention advantageously provides method and apparatus for implementing a protection scheme for switched networks, and particularly GMPLS networks. One embodiment is a method of reserving communications channels comprising an alternative path through a switched network, the network comprising a plurality of nodes interconnected by links, wherein each link comprises at least one communications channel. The method comprises simulating failure of a first link; noting a second link over which traffic on the first link is rerouted in the event of failure of the first link; and transmitting a protection request message ("PRM") from the first link to the second link to request reservation of a specified number of communication channels on the second link.

Another embodiment is a system for reserving communications channels comprising an alternative path through a switched network, the network comprising a plurality of nodes interconnected by links, wherein each link comprises at least one communications channel. The system comprises means for simulating failure of a first link and noting a second link over which traffic on the first link is rerouted in the event of failure of the first link; and means for transmitting a protection request message ("PRM") from the first link to the second link to request reservation of a specified number of communication channels on the second link.

Another embodiment is a link monitor for implementation in a node of a switched network, the network comprising a plurality of nodes interconnected by links, wherein each link comprises at least one communications channel. The link monitor comprises means for simulating failure of a first link associated with the link monitor; means for noting a second link over which traffic on the first link is rerouted in the event of failure of the first link; and means for transmitting a protection request message ("PRM") from the first link to the second link to request reservation of a specified number of communication channels on the second link.

Another embodiment is a computer-readable medium operable with a computer for reserving communications channels comprising an alternative path through a switched network, the network comprising a plurality of nodes interconnected by links, wherein each link comprises at least one communications channel. The medium has stored thereon instructions for simulating failure of a first link; instructions for determining a second link over which traffic on the first link is rerouted in the event of failure of the first link; and instructions for transmitting a protection request message ("PRM") from the first link to the second link to request reservation of a specified number of communication channels on the second link.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1C:
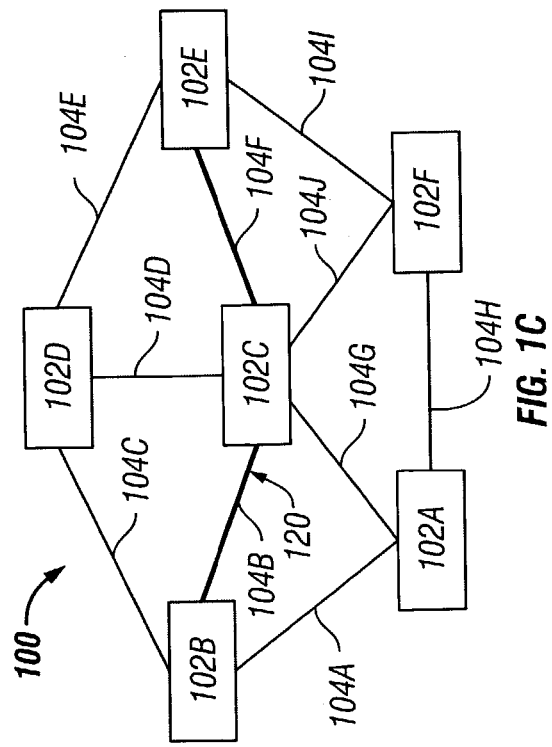
FIGS. 1A-1D illustrate the concepts of link failure and path reconstruction in an optical transport network comprising a plurality of nodes interconnected by links.
Figure 1D:
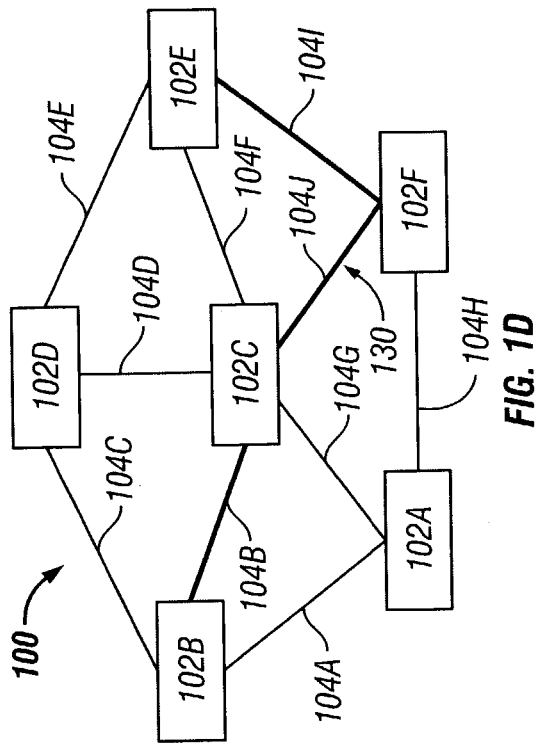
Figure 1A:
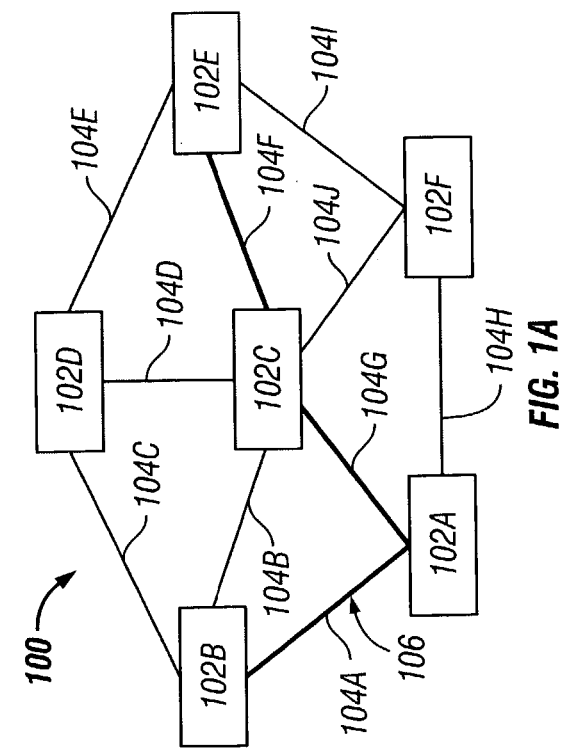
Figure 1B:
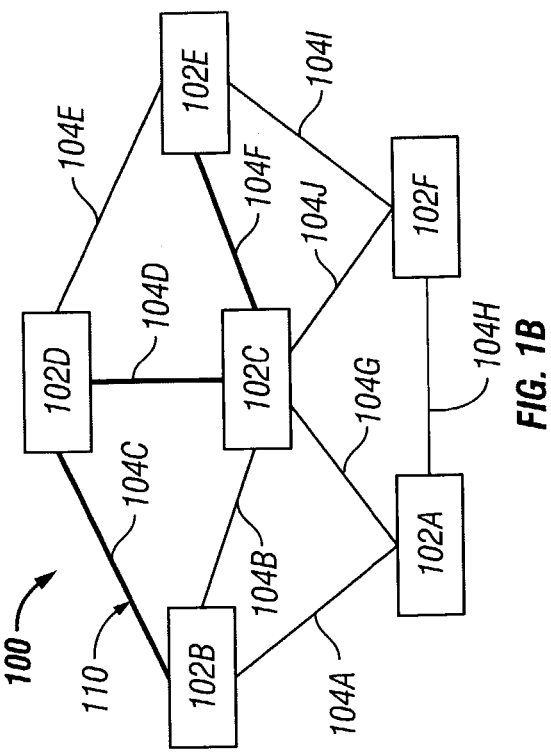

In the drawings, like or similar elements are designated with identical reference numerals throughout the several views thereof, and the various elements depicted are not necessarily drawn to scale.

Figure 2:
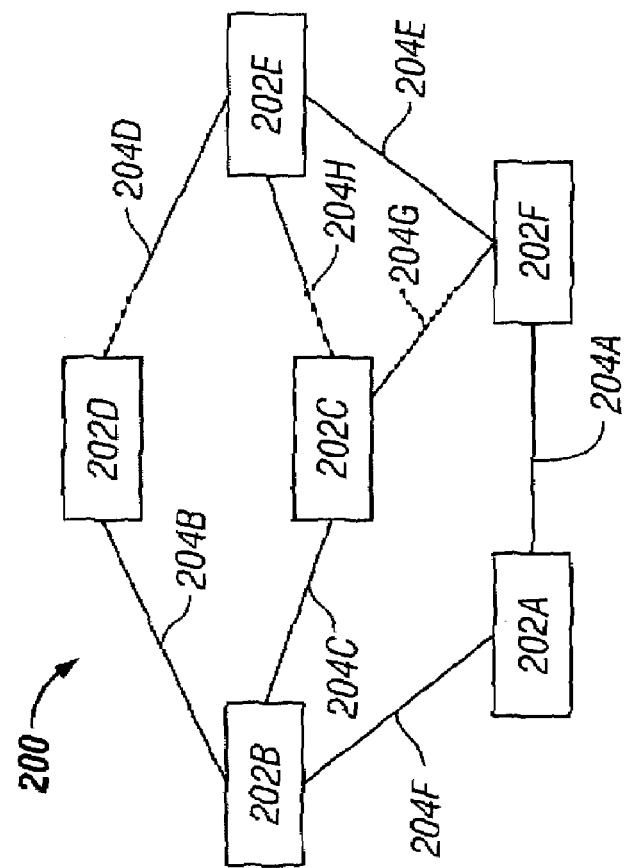
FIG. 2 illustrates a GMPLS optical transport network for implementing one embodiment.

FIG. 2 is a block diagram of a network 200 according to one embodiment. It should be noted that, although it will be assumed for the sake of example that the network 200 is a GMPLS optical transport network, the teachings set forth herein are applicable to any type of switched network, and are particularly applicable to GMPLS-type networks. As shown in FIG. 2, the network 200 includes a plurality of nodes, comprising optical cross-connects, respectively designated 202A-202F. The nodes 202A-202F are interconnected via links, respectively designated 204A-204H, comprising optical fibers. Although not illustrated in FIG. 2, it will be recognized that each of the links 204A-204A is capable of transporting data on one or more wavelengths, or channels. Therefore, when a communications path is established from node 202B to node 202F via node 202A using links 204F and 204A, one or more channels on links 204F and 204A will be designated for use in the path; the remaining channels on the links will be used for establishing other paths or will be reserved for protection, as will be described in greater detail below.

For purposes of simplicity and clarity herein, the links 204A-204H may be described herein as performing certain actions, like sending and receiving messages. In such cases, it should be noted that one of the nodes connected to the link, and not the link itself, actually performs the described function for the link. In this regard, for every link, one of the two nodes connected thereto is designated as the "monitor" for that link. The monitor acts as a proxy for the link, making computations and sending and receiving messages for the link. It will be presumed for the sake of example herein that the monitor for a link will be the one of the nodes connected thereto that has the highest node ID number, although it will be recognized that a different scheme (e.g., the node with the lowest ID number) could just as easily be employed. In any event, this scheme requires that each node must be aware of the node ID of the node on the far end of every adjacent link. This information can be configured manually, derived from in-band messages, or it can be determined by a link management protocol such as LMP.

Figure 3:
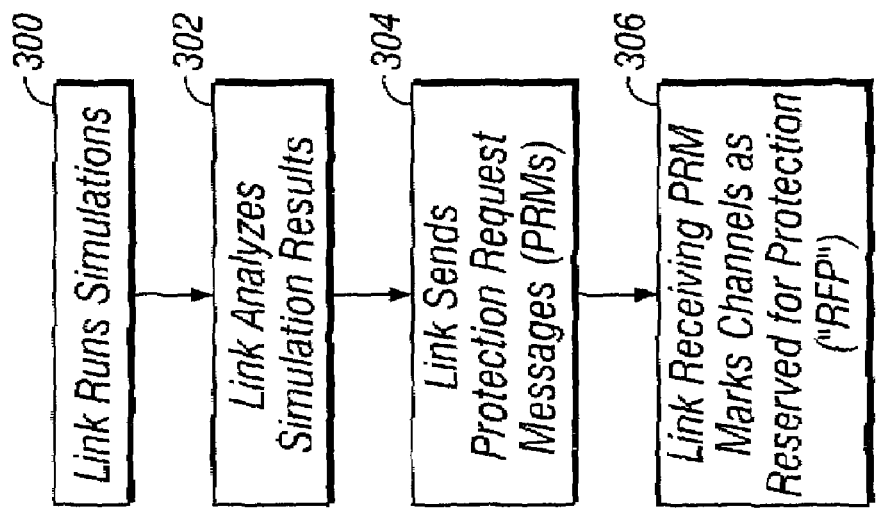
FIG. 3 is a flowchart of the operation of one embodiment.

FIG. 3 is a flowchart of the operation of one embodiment for causing a first link to generate appropriate Protection Request Messages ("PRMs") to other links to request reservation of protective channels thereon. Operation will be described from the perspective of a single link 204A; however, it will be recognized that the actions described in connection with FIG. 3 are performed by and in connection with each of the links 204B-204H in the network 200. In step 300, the link 204A runs a number of simulations. Each run simulates what would happen within the network 200 under current link state conditions as a result of the failure of the link 204A. The simulations are performed using the same restoration algorithm that is used in the event of an actual link failure within the network 200 and use information about the state of the network 200 collected from recent Link State Advertisements ("LSAs").

Therefore, what is needed in step 300 is a model of the network 100 informed by LSAs and knowledge of the restoration algorithm used in the network 100. One such restoration algorithm is "Open Shortest Path First" ("OSPF"), but other algorithms may be used as well.

Figure 4:
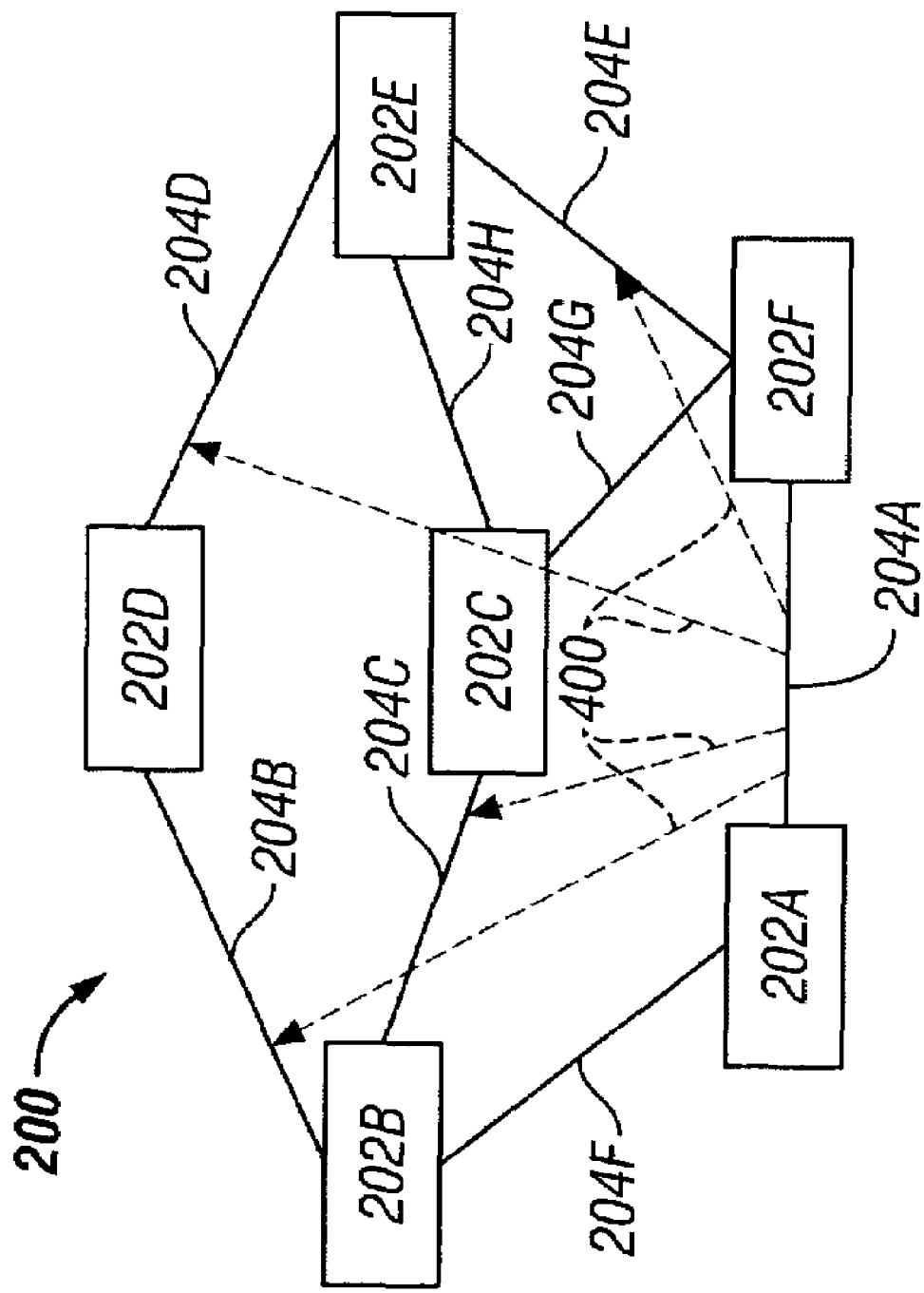
FIG. 4 illustrates an example of the operation of one embodiment in accordance with FIG. 3.

In step 302, the link 204A analyzes the results of the simulation runs. For example, link 204A might note that when it fails, traffic is often rerouted over links 204B, 204C, 204D, and 204E. In step 304, the link 204A sends "Protection Request Messages" ("PRMs") to the noted links (in this case, links 204B-204E). This step is illustrated in FIG. 4, in which dashed arrows 400 represent PRMs. Each PRM 400 requests that the recipient link mark a specified number of spare channels as being "reserved for protection" ("RFP"). The links marked RFP are not used to carry active traffic and are in actuality reserved for use in rerouting traffic in the event of a link failure in the network.

In step 306, responsive to receipt of a PRM, a recipient link, such as the link 204B, marks a number of spare channels as RFP as requested in the PRM. A spare channel is placed in RFP state only for a predetermined period of time and times out after that period unless renewed by a new PRM received prior to expiration of that time period. Once the RFP state "times out", the channel is returned to the pool of spare communications channels available for carrying active traffic of the link.

It should be noted that the maximum total number of channels in a link that are marked as RFP is the maximum of all of the protection requests from all other links. For example, if the link 204B has already marked three channels as RFP and the PRM from the link 204A requests two channels, then no additional channels will be marked RFP. In contrast, if the link 204B has marked two channels as RFP and the PRM from the link 204A requests three channels, then one additional channel will be marked RFP. In one embodiment, the time period associated with the two channels previously marked as RFP will be reset to expire with that of the third, newly marked, channel, so that the reservation of all three expires at the same time (unless an additional PRM is received in connection with one or more of the channels). The link receiving the PRM only considers the most recent request from each of the other links.

If the recipient link does not have enough spare channels to fill a protection request, then it marks all of the spare channels that it has available. For example, if the link 204B has three spare channels and the PRM from the link 204A requests four channels, then only three channels on the link 204B will be marked RFP.

In future LSAs, each link that has one or more channels reserved for protection will advertise that some number of its spare channels are marked RFP. It will be recognized working paths carrying non-preemptable classes of traffic cannot be routed over channels that are marked RFP. Moreover, it may be wise to avoid routing working paths carrying non-preemptable traffic over links that have only a few channels that are not marked RFP. Working paths carrying preemptable traffic classes may be preferentially routed over spare channels that are marked RFP. This can be accomplished in a very straightforward manner via the routing algorithm employed in the network 200. Subsequently, the RFP state at the recipient link is updated, meaning that it expires, is explicitly canceled, or is renewed by a new PRM from the same or another link.

Several events can cause a new PRM to be sent out. These include:
1. the routing of a new path through the link, wherein the class of service of the traffic on the link is protected;
2. a failure in the network;
3. expiration of a predetermined time period;
4. the observance of a certain level of change in recent LSAs; and
5. the need of a link to preallocate some protected spare channels.

There are two kinds of restoration algorithms, including path restoration algorithms and link restoration algorithms. Links are not permitted to preallocate protected spare channels in path-type restoration algorithm.

Based upon the foregoing Detailed Description, it should be readily apparent that the present invention advantageously provides a method and apparatus for generating and responding to protection request messages in an optical transport network.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of reserving communications channels comprising an alternative path through a switched network, the network comprising a plurality of nodes interconnected by links, wherein each link comprises at least one communications channel, the method comprising:
   performing a simulation of a failure of a first link;
   analyzing the simulation of the failure of the first link to determine at least a second link over which traffic on the first link is rerouted in response to the simulation of the failure of the first link; and
   transmitting a protection request message ("PRM") from the first link to the second link to request reservation of a specified number of communication channels on the second link, wherein the specified number of communications channels is determined in response to traffic rerouted to the second link in the simulation of the failure of the first link.

2. The method of claim 1 wherein the second link includes a plurality of spare communication channels, the method further comprising marking as reserved for protection ("RFP") the specified number of the spare communication channels of the second link.

3. The method of claim 2 further comprising, responsive to failure of the first link, rerouting traffic from the first link to the second link using communications channels marked as RFP.

4. The method of claim 2 further comprising, for each spare communications channel marked as RFP of the second link, setting a timer associated with the spare communications channel to a predetermined time period, wherein when the timer expires, the associated spare communications channel is no longer marked as reserved for protection.

5. The method of claim 4 wherein a first number of spare communications channels of the second link are already marked as RFP and wherein the first number is greater than the specified number of spare communications channels determined in response to traffic rerouted to the second link in the simulation of the failure of the first link, the method further comprising failing to mark any additional spare communications channels of the second link as RFP.

6. The method of claim 5 further comprising the second link resetting the timers for all of the spare communications channels marked as RFP to the predetermined time period.

7. The method of claim 1 wherein the number of spare communications channels of the second link is less than the specified number of communications channels requested by the first link, the method further comprising marking as reserved for protection ("RFP") additional spare communications channels of the second link to equal at least the specified number of communications channels requested by the first link.

8. A method of reserving communications channels comprising an alternative path through a switched network, the network comprising a plurality of nodes interconnected by links, wherein each link comprises at least one communications channel, the method comprising:
   performing a simulation of a failure of a first link;
   analyzing the simulation of the failure of the first link to determine at least a second link over which traffic on the first link is rerouted in response to the simulation of the failure of the first link; and
   transmitting a protection request message ("PRM") from the first link to the second link to request reservation of a specified number of communication channels on the second link, wherein the specified number of communications channels is determined in response to traffic rerouted to the second link in the simulation of the failure of the first link; and
   wherein a first number of spare communications channels of the second link are already marked as reserved for protection ("RFP") and wherein the first number is less than the specified number of communications channels, the method further comprising marking as RFP a number of spare channels of the second link equal to the difference between the first number and the specified number.

9. A system for reserving communications channels comprising an alternative path through a switched network, the network comprising a plurality of nodes interconnected by links, wherein each link comprises at least one communications channel, the system comprising:

means for performing a simulation of a failure of a first link and noting a second link over which a specified number of communication channels on the first link is rerouted in response to the simulation of the failure of the first link; and means for transmitting a protection request message ("PRM") from the first link to the second link to request reservation of the specified number of communication channels on the second link.

10. The system of claim 9 wherein the second link includes a plurality of spare communication channels, the system further comprising means for marking as reserved for protection ("RFP") the specified number of the spare communication channels of the second link.

11. The system of claim 10 further comprising means responsive to failure of the first link for rerouting traffic from the first link to the second link using communications channels marked as RFP.

12. The system of claim 10 further comprising means for setting a timer associated with each spare communications channel marked as RFP to a predetermined time period, wherein when the timer expires, the associated spare communications channel is no longer reserved for protection.

13. The system of claim 12 wherein a first number of spare communications channels of the second link are already marked as RFP and wherein the first number is greater than the specified number of communications channels, the system further comprising means for resetting the timers for all of the communications channels marked as RFP to the predetermined time period.

14. The system of claim 9 wherein the number of spare communications channels of the second link is less than the specified number of communications channels requested by the first link, the system further comprising means for marking as reserved for protection ("RFP") all of the spare communications channels of the second link.

15. The system of claim 9 wherein the network is an optical transport network, each link is an optical fiber, and each communications channel is a wavelength.

16. The system of claim 9 wherein the network is a GMPLS-type network.

17. A system for reserving communications channels comprising an alternative path through a switched network, the network comprising a plurality of nodes interconnected by links, wherein each link comprises at least one communications channel, the system comprising:
over which a specified number of communication channels the first link is rerouted in response to the simulation of the failure of the first link; and means for transmitting a protection request message ("PRM") from the first link to the second link to request reservation of the specified number of communication channels on the second link; and wherein a first number of spare communications channels of the second link are already marked as reserved for protection ("RFP") and wherein the first number is less than the specified number of communications channels, the system further comprising means for marking as RFP a number of spare channels thereof equal to the difference between the first number and the specified number.

18. A link monitor for implementation in a node of a switched network, the network comprising a plurality of nodes interconnected by links, wherein each link comprises at least one communications channel, the link monitor comprising:
means for simulating failure of a first link associated with the link monitor;
means for noting a second link over which traffic on the first link is rerouted during the simulating of the failure of the first link; and
means for transmitting a protection request message ("PRM") from the first link to the second link to request reservation of a specified number of communication channels on the second link in response to the traffic on the first link rerouted during the simulating of the failure of the first link.

19. The link monitor of claim 18 further comprising means responsive to receipt of a PRM for marking as reserved for protection ("RFP") a specified number of the spare communication channels of the second link.

20. The link monitor of claim 19 further comprising means for setting a timer associated with a spare communications channel marked as RFP to a predetermined time period, wherein when the timer expires, the associated spare communications channel is no longer reserved for protection.

21. The link monitor of claim 18 wherein the node of the switched network is an optical cross-connect, the first link is an optical fiber, and each communications channel is a wavelength.

22. A computer-readable medium operable with a computer for reserving communications channels comprising an alternative path through a switched network, the network comprising a plurality of nodes interconnected by links, wherein each link comprises at least one communications channel, the medium having stored thereon:
instructions for simulating failure of a first link;
instructions for determining a second link over which a specified number of communication channels is rerouted from the first link during the simulating of the failure of the first link; and
instructions for transmitting a protection request message ("PRM") from the first link to the second link to request reservation of the specified number of communication channels on the second link.

23. The computer-readable medium of claim 22 further having stored thereon instructions for marking as reserved for protection ("RFP") a specified number of spare communication channels of the second link.

24. The computer-readable medium of claim 23 further having stored thereon instructions responsive to failure of the first link for rerouting traffic from the first link to the second link using communications channels marked as RFP.

25. The computer-readable medium of claim 23 further having stored thereon instructions for setting a timer associated with each communications channel marked as RFP to a predetermined time period, wherein when the timer expires, the associated communications channel is no longer reserved for protection.

* * * * *